March 17, 1970          J. L. BENAK          3,501,272

CARBON PURIFICATION PROCESS

Filed Feb. 28 1966

INVENTOR.
JAMES L. BENAK
BY
ATTORNEYS

United States Patent Office 3,501,272
Patented Mar. 17, 1970

3,501,272
CARBON PURIFICATION PROCESS
James L. Benak, Cleveland, Ohio, assignor to The Standard Oil Company, Cleveland, Ohio, a corporation of Ohio
Filed Feb. 28, 1966, Ser. No. 530,681
Int. Cl. C01b 31/02
U.S. Cl. 23—209.9
4 Claims

ABSTRACT OF THE DISCLOSURE

The invention described herein is a process for the purification of carbon. That process provides for the treatment of carbon with hydrofluoric acid, or a mixture of hydrofluoric acid and nitric acid, followed in each case by treatment with hot aqueous hydrochloric acid. The carbon thus purified is notably effective for use as electrode material in a demineralization cell, i.e., one used for the demineralization of water.

---

Figure 1:
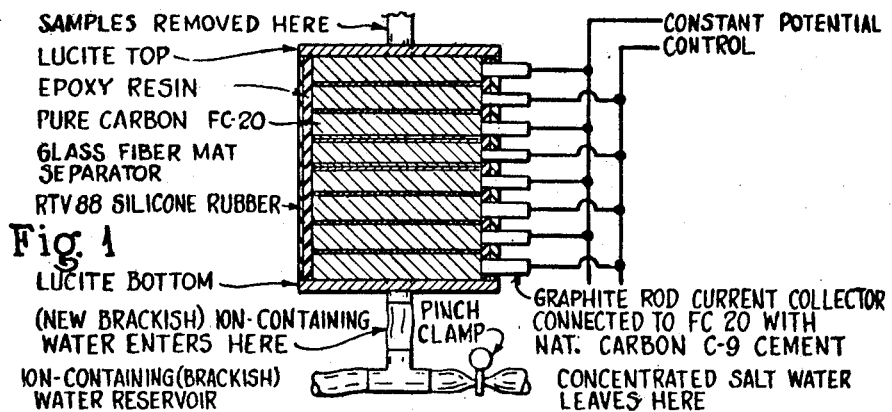

This invention relates to a novel process for purifying and refining carbon to produce novel carbons. Still further the invention relates to the use of the novel carbons in the demineralization of water.

THE PROBLEM

Carbon is a plentiful substance. It occurs mainly in natural forms such as wood and the like. In addition to carbon, these precursors contain several non-carbon materials, making up the total ash on combustion. The amount of ash can vary substantially. Thus, tree woods may contain 3% or more of ash. On the other hand, coconut hulls may contain as low as .55% ash. In addition to various refractory oxides, the ash commonly contains silica ($SiO_2$) and graphitoidal silicon (Si in certain crystalline state). Some char carbons contain both contaminants, while others contain one or the other of the contaminants. For many applications, such as electrodes and the like, the presence of the ash components is deleterious.

There have been many attempts in the prior art to remove the silica and/or graphitoidal silicon so that the carbon might have application for more sophisticated uses than would otherwise be possible.

THE DEMINERALIZATION ASPECT

A major problem that has been encountered in the development of a double-layer water demineralization apparatus has been the clogging of the electrodes, which reduces their efficiency below practical levels in a relatively short period of time. In this type of demineralization cell, porous carbon electrodes are inserted into a body of water and a carefully selected electrical potential is applied to attract the mineral ions contained in the water to the surfaces of the electrodes. The ions are held in opposed relation to an electron charge in the electrode in a double-layer condition, analogous to the storage of electrical energy in a capacitor.

After a given interval, the current is reversed and the retained ions are theoretically discharged in a wash stream of water to clean the electrodes so that a repeat demineralization cycle can then be effected.

The problem was however that due to some unknown component in the structure of the carbon, such apparently as silica and ash, the collected mineral content from the water could not be released effectively. The result was that the electrodes clogged badly and soon became inoperable.

CONTRIBUTION TO THE ART

Accordingly, a substantial contribution to the art would be provided by a unique electrode carbon applicable for use in the electrostatic demineralization of water.

Further, a substantial contribution to the art would be provided by a novel process for treating carbons to eliminate silica and/or graphitoidal silicon and ash therefrom.

Still further, a substantial contribution to the art would be provided by a novel water demineralization process utilizing electrodes prepared in accordance with the present invention.

In view of the foregoing, the present invention is concerned with a specific procedure for treatment of carbon with strong acids in a manner which is not only effective to remove impurities, but also to alter the composition and surface characteristics in such a way as to make the carbon unique for demineralization usage.

Accordingly, it is an important object of the present invention to provide a novel purified carbon, having a unique structure, as shown by its unexpectedly good action in an electrostatic demineralization cell.

A further object is to provide a novel process for treating carbon to remove impurities therefrom, and simultaneously alter the structure thereof.

A further object is to provide a novel electrode for use in an electrostatic demineralization operation, and accordingly a novel electrostatic demineralization process.

Other objects of this invention will appear in the following description and appended claims. It is to be understood that the terminology employed is for the purpose of description and not of limitation.

Figure 2:
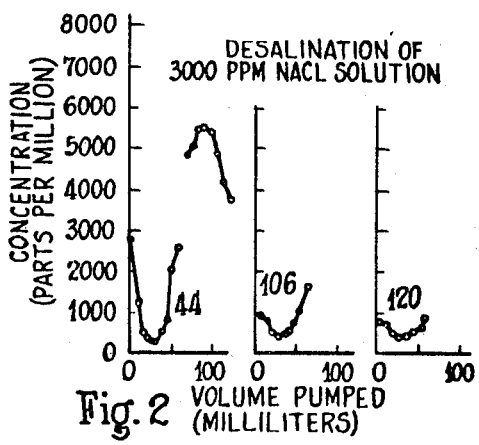
Figure 3:
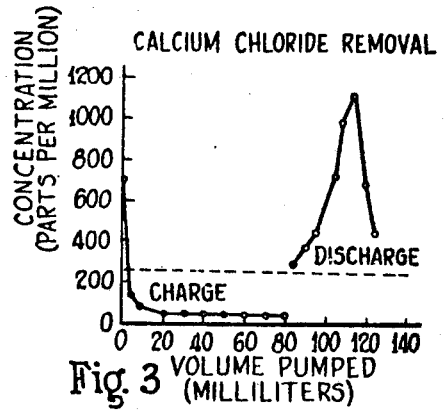
Figure 4:
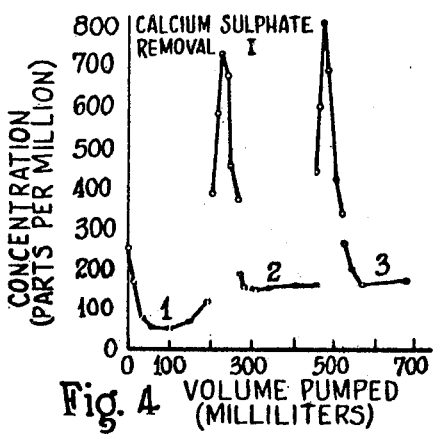
Figure 5:
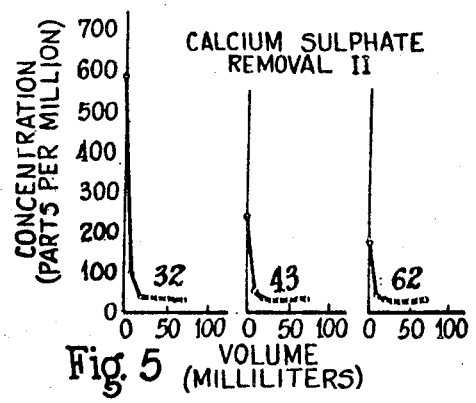

FIGURE 1 is a sectional view of a demineralization cell;
FIGURE 2 is a graphic illustration of sodium chloride removal from aqueous sodium chloride;
FIGURE 3 is a graphic illustration of calcium chloride removal from aqueous calcium chloride;
FIGURE 4 is a graphic illustration of calcium sulfate removal from aqueous calcium sulfate; and
FIGURE 5 is a graphic illustration of the improvement provided by the present invention in calcium sulfate removal.

THE METHOD OF INVENTION

Introduction

Briefly, in accordance with the present invention, carbons containing silica and/or graphitoidal silicon residues, and other ash components, are treated with strong acids in a sequence of steps, followed by thorough washing. It apparently is advantageous to thereafter dry the so-treated carbon in order to complete the conversion of the structure to the novel form, before it is used in a demineralization cell.

There are two aspects of carbon treatment in accordance with the present invention, as follows:
(1) Silica and ash removal: The use of hydrofluoric acid, followed by boiling with hydrochloric acid; and
(2) Graphitoidal silicon and ash removal: Treating the carbon with a mixture of hydrofluoric and nitric acids, followed by hydrochloric acid and water washes.

The two procedures may be used independently, or jointly, depending on whether the carbon form contains both silica and graphitoidal silicon, or only one of these contaminants.

In view of the foregoing, the various aspects of the inventive process will now be described in detail.

SILICA REMOVAL

This aspect of the invention is shown by the following example.

Example I

Pieces of type FC-20 carbon were obtained from the Pure Carbon Company of St. Mary's, Pa., of 1/8″ thickness. This carbon has a surface area of 600 m.²/gm. and has a negligible resistance to the flow of water through it in a demineralization cell. Other characteristics of this carbon are as follows:

| | |
|---|---|
| Median pore diameter, microns | 20 |
| Pore void volume, cm.³/gm. carbon: | |
|     Macropores, 100–0.035 microns | .83 |
|     Micropores, less than 0.035 micron | .62 |
|     Total | 1.45 |
| Porosity, volume percent | 77 |
| Flow resistance,[1] mm. Hg/cm. | <0.01 |
| Physical properties: | |
|     Average density, gm./cc. | 0.53 |
|     Flexural strength, p.s.i | 200 |
|     Scleroscope hardness | 10–20 |
|     Specific resistance, ohm/cm. | 0.2 |
| Chemical properties: | |
|     Ash, percent | 7 |
|     Sulfur, percent | 0.01 |
|     Spectrographic on ash, selected elements, percent— | |
|         $SiO_2$ | Major |
|         $Al_2O_3$ | 10.0 |
|         $Fe_2O_3$ | 7.0 |
|         $CaO$ | 0.75 |
|         $MgO$ | 0.75 |
|         $TiO_2$ | 1.5 |
|         $Na_2O$ | 3.0 |
|         $K_2O$ | 6.0 |

[1] Pressure required to force nitrogen gas, 1 cm.³/min. cm.² through a section 1 cm. thick.

The carbon was treated as follows:

(1) The carbon pieces were immersed in a 70% aqueous solution of hydrofluoric acid for a period of 16 hours.

(2) The carbon pieces were then transferred to a solution of 20.2% aqueous hydrochloric acid and boiled for a period of 1 hour.

The carbon pieces were then transferred to fresh aqueous hydrochloric acid of 20.2% concentration and the second step was repeated for a total of 6 times.

(3) The carbon pieces were removed from the hydrochloric acid and immersed in distilled water and boiled for ½ hour. This treatment was repeated for a total of 3 times. Substantially all of the hydrochloric acid was removed by so operating.

(4) The carbon pieces were dried in a hot air circulating oven at a temperature of 100° C. for a period of 16 hours.

(5) An optional step to assure removal of absorbed species, such as chlorides. The carbon pieces were then rinsed thoroughly with an aqueous solution of about 4% hydrochloric acid.

(6) The carbon pieces were then immersed in distilled water and boiled for ½ hour. This step was repeated for a total of 2 times with boiling distilled water.

(7) Finally, the carbon pieces were dried in a hot air circulating oven at a temperature of 100° C. for a period of 16 hours.

After treatment this carbon contained .05% total ash, and was substantially free of $SiO_2$.

After this total treatment, the carbon pieces were utilized as electrodes in a demineralization cell as described below, operating with an aqueous calcium sulphate solution as the medium to be deionized. Ion removal was excellent as indicated in FIGURE 5.

GRAPHITOIDAL SILICON REMOVAL

This aspect of the invention is shown by the following examples:

Example II–A

Pieces of type FC-13 carbon were obtained from the Pure Carbon Company, St. Mary's, Pa., of 1/8″ thickness. Before treatment by the present invention this carbon contained 10.50% ash, which included 4.97% $SiO_2$ and 1.50% graphitoidal silicon, based on total material. Other characteristics of this carbon are as follows:

| | |
|---|---|
| Median pore diameter, microns | 2.1 |
| Pore void volume, cm.³/gm. carbon: | |
|     Macropores, 100–0.035 microns | 0.28 |
|     Micropores, less than 0.035 micron | 0.24 |
|     Total | 0.52 |
| Porosity, volume percent | 47 |
| Flow resistance,[1] mm. Hg/cm. | 12 |
| Physical properties: | |
|     Surface area m.²/gm. | 450 |
|     Average density, gm./cc. | 0.90 |
|     Flexural strength, p.s.i. | 1,600 |
|     Scleroscope hardnes | 35–45 |
|     Specific resistance, ohm/cm. | 0.03 |
| Chemical properties: | |
|     Ash, percent | 10.50 |
|     Sulfur, percent | 0.01 |
|     Spectrographic on ash, selected elements, percent— | |
|         $SiO_2$ | Major |
|         $Al_2O_3$ | 0.8 |
|         $Fe_2O_3$ | 2.5 |
|         $CaO$ | 0.5 |
|         $MgO$ | 0.2 |
|         $TiO_2$ | 0.02 |
|         $Na_2O$ | 2.0 |
|         $K_2O$ | |

[1] Pressure required to force nitrogen gas, 1 cm.³/min. cm.² through a section 1 cm. thick.

The carbon was treated as follows:

(1) The pieces of carbon were immersed in a mixture of 20–25% nitric acid and 70–75% hydrofluoric acid for 16 hours.

(2) The carbon pieces were subjected to 6 successive 1 hour boiling treatments with 20.2% aqueous hydrochloric acid.

(3) The carbon pieces were immersed in distilled water and boiled for ½ hour, for a total of three separate fresh water treatments.

(4) The pieces were dried at 100° C. for 16 hours.

(5) The pieces were rinsed thoroughly with about 4% aqueous hydrochloric acid.

(6) The pieces were then immersed in distilled water and boiled for ½ hour, for a total of two treatments.

(7) Finally, the carbon pieces were dried in a hot air circulating oven at a temperature of 100° C. for a period of 16 hours.

After treatment this carbon contained 0.24% ash, which included 0.04% $SiO_2$ and less than 0.01% Si, based on total material. The remainder of the ash comprised trace amounts of $Al_2O_3$, $Fe_2O_3$, $CaO$, $MgO$, $TiO_2$ and $Na_2O$.

Example II–B

This example illustrates that hydrochloric acid treatment is ineffective to remove graphitoidal silicon. Pieces of Purebon FC-13 carbon, as in Example II–A, were utilized. Before treatment this carbon contained 10.5% ash, including 4.97% $SiO_2$ and 1.50% graphitoidal silicon, all based on total material.

The pieces were first immersed in hydrofluoric acid of 70% concentration for 16 hours.

The pieces were then removed and placed in 20.2% aqueous hydrochloric acid and boiled for ½ hour. This treatment was repeated for a total of 3 times.

The pieces were then immersed in distilled water and boiled for ½ hour, for a total of three treatments.

The pieces were then dried for 16 hours at 100° C.

Analysis after treatment showed about 0.1% $SiO_2$, and graphitoidal silicon of 1.50%. There was a total of 1.64% ash after this attempted purification.

It was clearly evident that this treatment did not remove graphitoidal silicon.

DISTINCTIONS FROM THE PRIOR ART

To test the effectiveness of gaseous chlorine on the removal of impurities, a sample of FC-13 carbon was chlorinated at 1000° C. for 16 hours. The total silicon content, including that of $SiO_2$ and graphitoidal Si, was reduced only slightly, from 5% to about 3%, leaving considerable ash.

By the process of the present invention, on the other hand, the same carbon had the entire silicon content, and substantially all of the ash, removed.

THE DEMINERALIZATION ASPECT

Example III

A demineralization cell was fabricated as represented in schematic form in FIGURE 1. The raw carbon used in Example I, namely FC-20 a high surface area material from Pure Carbon Company, St. Mary's, Pa., was used for the electrodes. The carbon had a surface area of 600 m.²/gm. with a negligible resistance to flow of water through it. The cell comprised a plurality of electrodes ⅛″ thick, each cemented to a graphite rod current collector. Glass fiber separators were used between electrodes. The electrodes were stacked and encased in an epoxy resin container, sealed on the outside with silicone rubber. Methyl methacrylate (Lucite, trademark) top and bottom plates completed the unit.

The cell was utilized for the removal of ionic materials from hard well water. Opposite electrical charges were imposed on adjacent electrodes. It was found that the electrodes quickly plugged up to such an extent that no water could be pumped through the cell.

In view of this failure, several runs were made to demineralize synthetic hard water solutions containing single components of the original well water in order to determine which ionic component, or combination of ionic components, was responsible for the electrode plugging.

Sodium chloride: An identical cell was constructed, using the raw FC-20 carbon for electrode material. Thirty (30) ⅛″ electrodes were used to provide a column volume of 40 cc.

This cell was used for the demineralization of an aqueous solution containing 300 p.p.m. of sodium chloride. The cycle time for cell operation was 1 hour; comprising, charging and discharging times of 20 minutes each, and pumping time of 10 minutes.

Results are shown in FIGURE 2 of the drawings. The numerals 44, 106 and 120 refer to cycle numbers. The concentration of sodium chloride in the effluent demineralized water is approximately 350 p.p.m., which is well below the average concentration of about 500 p.p.m. of sodium chloride in fresh water.

It will be noted that the effectiveness of the cell continues to improve even after 120 cycles.

Calcium chloride: An identical cell was constructed using raw FC-20 carbon for electrodes. Twenty (20) ⅛″ electrodes were used to provide a column volume of 20 cc.

This cell was used for the demineralization of an aqueous solution containing 250 p.p.m. of calcium chloride with the results shown in FIGURE 3. In this case the graph shows the composition of the water removed after typical charge and discharge cycles. Again excellent ion removal was obtained. The effluent demineralized water had a concentration of only 25 p.p.m. of calcium chloride which can be favorably compared with a concentration of about 85 p.p.m. of calcium chloride in a typical municipal water supply.

Calcium sulfate: Drastic ion removal decrease. Results observed using a demineralization cell similar to that depicted in FIGURE 1, operating on an aqueous solution of calcium sulfate are shown in FIGURE 4. Ion removal was observed as decreasing rapidly with each cycle; in fact, ion removal was so poor as early as the third cycle that the operation was terminated. These results provided a strong indication that a major source of the difficulty encountered in the attempted demineralization of natural well water was related to the calcium sulfate component.

INVENTION OF TREATED CARBON ELECTRODES

Many expedients were investigated in an attempt to improve the removal of calcium sulfate from aqueous solution, including the reversal of positive and negative electrodes, adjustment of the discharge potential of the cell, and the utilization of various types of carbon as electrode materials. However, none of these were successful. It has been found unexpectedly that the acid-treated carbon of this invention provides satisfactory removal of calcium sulfate.

Example IV

Novel carbon usage: A cell was constructed similar to the cell diagrammed in FIGURE 1, with the exception that the electrodes were fabricated of ⅛″ thick pieces of type FC-20 carbon which had been pretreated with hydrofluoric and hydrochloric acids according to the process of Example I. The results of this cell operating on an aqueous calcium sulfate solution are shown in graphic form in FIGURE 5. The numerals 32, 43 and 62 refer to the number of cycles of operation. It is quite apparent that the cell is functioning as effectively in removing calcium sulfate after 62 cycles of operation as it was initially. Thus the practicability and utility of the method of the present invention are amply demonstrated.

Example V

This example illustrates that FC-13 carbon is also improved for demineralization usage by treatment in accordance with the present invention.

Two sets of electrodes were prepared from Purebon FC-13 carbon, 1″ x 3″ x ⅛″. This carbon is described in Example II-A above. One set was purified as follows:

(1) The carbon pieces were immersed in a mixture of 20–25% $HNO_3$ and 70–75% HF for approximately 16 hours, followed by:

(2) Six successive one hour boilings with 20.2% aqueous HCl.

(3) The carbon pieces were then immersed in distilled water and boiled for ½ hour for a total of three separate fresh water treatments.

(4) The pieces were then dried at 100° C. for 16 hours.

(5) Pieces immersed in 4% aqueous HCl.

(6) Pieces immersed in distilled water and boiled for 2 hours for a total of 2 treatments.

(7) Pieces dried at 100° C. for 16 hours.

This process is slightly different from that described in Example II-A.

Identical pieces of purified and unpurified electrodes were placed in 2 Normal aqueous KCl for 196 hours soaking time. The electrodes were then cycled between 0–1 volt for approximately 30–40 cycles. Capacity studies were then determined. The result was that the purified electrodes had twice the capacity of the unpurified electrodes.

In summary, tests on unpurified and purified FC-13 carbon electrodes in aqueous KCl showed that the purified FC-13 resulted in twofold improvement in demineralization over the identical unpurified FC-13.

What is claimed is:

1. A process for purifying carbon containing silicon comprising the following steps, in order:

immersing said carbon in a mixture of concentrated aqueous hydrofluoric acid and nitric acid,
immersing said carbon in boiling aqueous hydrochloric acid,
rinsing said carbon with water, and
drying said carbon.

2. A process as in claim 1 wherein the aqueous hydrofluoric acid is of about 70% concentration.

3. A process as in claim 1 wherein the aqueous hydrochloric acid is of about 20% concentration.

4. A process as in claim 1 wherein the aqueous hydrochloric acid is heated at its boiling point.

References Cited

FOREIGN PATENTS

| | | |
|---|---|---|
| 23,233 | 1899 | Great Britain. |
| 17,731 | 1913 | Great Britain. |

OTHER REFERENCES

Strasheim: "Chemical Abstracts," vol. 43, 1949, col. 5336–5337.

Parisot et al.: "Chemical Abstracts," vol. 46, 1952, col. 5973(g).

Kirk-Othmer Encyclopedia of Chemical Technology, vol. 4, 2nd ed., 1964, pp. 189–190.

EDWARD J. MEROS, Primary Examiner

U.S. Cl. X.R.

23—209.2; 136—121; 204—149